United States Patent

[11] 3,568,956

[72] Inventor Clayton I. Swanson
 4029 Phinney Ave. North, Seattle, Wash. 98103
[21] Appl. No. 764,830
[22] Filed Oct. 3, 1968
[45] Patented Mar. 9, 1971

[54] MEANS FOR REDUCING AIR PRESSURE AGAINST LEADING EDGE PORTIONS OF AIRPLANE WINGS AND AILERONS
1 Claim, 5 Drawing Figs.

[52] U.S. Cl. .................................................. 244/41, 102/105, 114/67, 244/42, 244/130
[51] Int. Cl. ................................................. B64c 1/38, B64c 23/02
[50] Field of Search........................................ 244/130, 40, 42.50, 41, 10; 114/67; 102/105

[56] References Cited
UNITED STATES PATENTS

| | | | |
|---|---|---|---|
| 980,964 | 1/1911 | Kalous.................... | 114/67 |
| 1,258,428 | 3/1918 | Marling...................... | 114/67 |
| 1,320,020 | 10/1919 | Maly ........................ | 114/67 |
| 1,725,316 | 8/1929 | Strong........................ | 244/10 |
| 3,062,148 | 11/1962 | Le Bel....................... | 102/105 |

FOREIGN PATENTS

| | | | |
|---|---|---|---|
| 233,083 | 5/1925 | Great Britain................ | 244/41 |
| 335,167 | 2/1936 | Italy ............................ | 244/40 |

*Primary Examiner*—Milton Buchler
*Assistant Examiner*—Jeffrey L. Forman
*Attorney*—Fred C. Matheny ABSTRACT: This disclosure relates to means for reducing the back pressure of a fluid against a vehicle moving in, on or through said fluid. It can be applied to both air- and waterborne vehicles. When applied to waterborne ships and the like it reduces back pressure and friction of the water against their prow portions. When applied to air vehicles which travel at supersonic speeds it reduces air pressure and air friction against the leading edges of wings, ailerons, nose cones and the like and helps to prevent overheating and sonic boom.

PATENTED MAR 9 1971   3,568,956

INVENTOR.
Clayton I. Swanson
BY
Fred C. Mathews
ATTORNEY

3,568,956

MEANS FOR REDUCING AIR PRESSURE AGAINST LEADING EDGE PORTIONS OF AIRPLANE WINGS AND AILERONS

BACKGROUND OF THE INVENTION

1. Field of the Invention

My invention relates to means for lessening fluid pressure against fluid borne vehicles for the purpose of saving fuel and increasing their speed, and in the instance of high speed air- and spacecraft, for the purpose of lessening the undesirable effects and dangers due to air pressure buildup and the heat, noise and ionization resulting therefrom.

2. Description of the Prior Art

The undesirable effects of air pressure buildup against, around and in advance of the leading edge portions of the wings, ailerons and rudders of high speed airplanes and against and around the nose cones of missiles and space vehicles is well known. When an airplane moves through the air at high speed air pressure builds up directly in front of the leading edges of wings, ailerons and like parts. This air pressure buildup is sometimes referred to as a bow wave. This back pressure increases with the speed of the plane and tends to retard this speed and a mass or column of highly compressed air extends outwardly for a long distance in front of the plane. When this back pressure has built up to a predetermined extent which occurs at about the time the plane attains a supersonic speed, this body or column of compressed air expands and breaks up rapidly and in so doing produces an undesirable noise known as sonic boom.

In missiles and spacecraft this buildup of air pressure in front of the nose cone or forward end of the craft results in the generation of extreme heat which can destroy the craft or intensely heat the interior of the same. In attempting to solve this problem of heat buildup much effort has been directed to the production of materials which will resist and will not be destroyed by this intense heat and which will not conduct or transmit too much of this heat to the interior of the spacecraft. Also much effort has been devoted to devising successful methods of cooling nose cones and like parts.

SUMMARY OF THE INVENTION

A general object of my invention is to provide means for reducing or retarding the buildup of fluid pressure or the formation of a bow wave in front of and against the leading parts of vehicles and like movable objects by substantially covering said leading portions with rollers positioned and supported so they will be rotated by pressure against them of the fluid through which the vehicles or objects are moving and will combine to form a fluid contacting surface which will move with and be moved by the fluid and will deflect the fluid more easily than a nonmovable surface will, and in so doing reduce back pressure against the vehicle and reduce pressure buildup in the fluid in front of the leading portions of the vehicle and in so doing make possible a saving in fuel and an increase in vehicle speed.

As respects airplanes capable of traveling at supersonic speeds an object of my invention is to minimize air pressure buildup in front of the leading edges of the wings, ailerons and the like thereby greatly reducing the possibility that the plane will produce the undesirable noise known as sonic boom.

As respects spacecraft an object of my invention is to construct the nose cones and leading parts of these craft so there will be less buildup of air pressure against them and consequently less heat generated in and around them upon reentry of the craft from space into the earth's atmosphere.

Other objects of my invention will be apparent from the following description and accompanying drawings.

BRIEF DESCRIPTION OF THE DRAWINGS

Like reference numerals refer to like parts throughout the several views.

DESCRIPTION OF THE PREFERRED EMBODIMENTS

Figure 1:
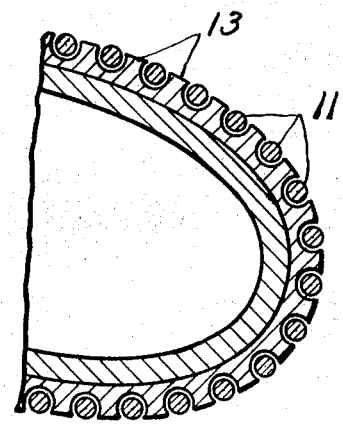
FIG. 1 is a somewhat diagrammatic sectional view showing the leading edge portion of an airplane wing made in accordance with my invention.
Figure 2:
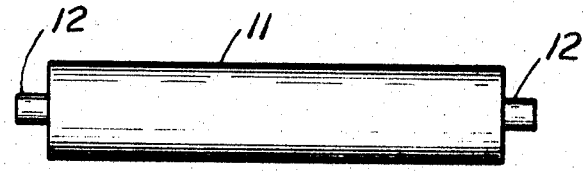
FIG. 2 is a detached elevational view on an enlarged scale showing a roller suitable for use in the manner illustrated in FIG. 1.

In FIG. 1 the numeral 10 indicates the leading edge portion of an airplane wing of conventional shape and 11 indicates any one of a multiplicity of small rollers which are rotatively mounted in as close formation as possible in said leading wing edge portion 10. Each of said rollers, as shown in FIG. 2, has two axial bearing pins protruding from opposite ends thereof. Each roller 11 is countersunk by positioning it within a suitable recess 13 in the exterior of the leading edge part 10 of the wing. Suitable bearings, not shown, are provided in the wing part 10 for the rollers and said rollers extend lengthwise of the leading edge portion 10 of the wing and their outermost peripheral portions form a large part of the outer surface of said leading edge part 10. In many instances the rollers will be staggered or longitudinally offset relative to each other and in some instances they may be transversely offset, the object being to have the rollers form as much of the leading edge surface as possible.

The rollers 11 cooperate in forming a movable leading edge surface which is moved by the air and moves with the air and across which air will move more easily and with less pressure buildup than it will over a nonmovable surface. Reducing the back pressure or pressure buildup in front of the leading edge parts of a plane will enable the plane to accelerate faster and keeping this air pressure buildup below a predetermined limit will prevent the occurrence of sonic boom.

Rollers 11 of the type shown in FIGS. 1 and 2 are well adapted for use on the prow portions of ships. When these rollers 11 are used on the prow parts of ships they will be installed in recesses in substantially the manner illustrated in FIG. 1 but will be positioned with their axes generally upright and their exposed surfaces will move with the water thus reducing friction and back pressure of the water against the ship and enabling the ship to travel at a faster speed in proportion to the power expended in driving it. The rollers 11 will operate better in some instances if they are longitudinally grooved or ribbed so they will be more easily rotated by air or water passing over them. These rollers can be used on surface ships, hydrofoils and submarines and can be rotatively mounted in brass bushings, ball bearings or any other approved type of bearing. In some instances they will be formed of titanium. When used on normally upright rudders or ailerons the rollers will be approximately upright.

Figure 3:
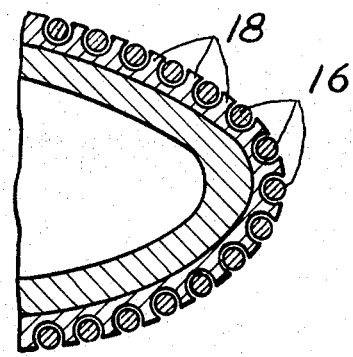
FIG. 3 is a somewhat diagrammatic sectional view showing the nose cone or leading end part of a spacecraft made in accordance with my invention.
Figure 4:
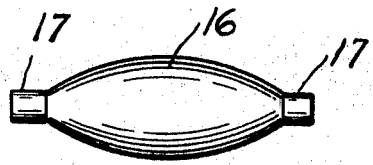
FIG. 4 is a detached elevational view on an enlarged scale of a roller suitable for use in the manner illustrated in FIG. 3.

Referring to FIGS. 3 and 4 the numeral 15 indicates the usually rounded leading end part of a missile or space vehicle, ordinarily termed the nose cone, and 16 indicates any one of a multiplicity of rollers rotatively mounted in as close formation as possible on the exterior of said nose cone. Each roller 16 is of oval shape and made to a curvature which conforms to the curvature of the nose cone on which it is used and each roller 16 has two axial bearing pins 17 on its respective ends. The rollers 16 are installed in suitable recesses 18 in the nose cone 15 and the outer surfaces of these rollers form a large part of the outer surface of the nose cone. Thus the exposed peripheral portions of these rollers 16 form a movable surface against which the air impinges and over which it passes and this surface is moved by and moves with the air and this lessens the buildup of pressure in front of and around the nose cone or leading end portion of the space vehicle. It also lessens air friction on the nose cone and minimizes heat generation and ionization of the air around the space vehicle. Lessening air ionization makes it easier to maintain communication between the space vehicle and stations on the earth's surface.

Figure 5:
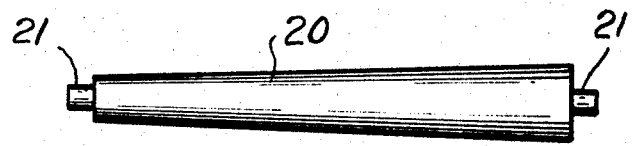
FIG. 5 is an elevational view of a roller suitable for use in a tapered leading edge part of a vehicle.

FIG. 5 discloses a tapered or frustroconically-shaped roller 20 having axial bearing pins 21. This roller 20 is well adapted for use on the leading edges of airplane wings, ailerons and the like which are tapered, that is on wings, ailerons and the like which are thinner at their outer ends than they are where they are connected with the body of the plane. In such instances the tapered rollers 20 make possible a smoother surface and more movable area than the cylindrical rollers will provide.

The foregoing description and accompanying drawings clearly disclose preferred embodiments of my invention but it will be understood that changes may be made within the scope of the following claims.

I claim:

1. The combination with an airplane provided with wings and ailerons having leading edge portions against which air impinges and exerts a back pressure and by which the air is compressed and deflected and over which it passes as the airplane moves through it; of a multiplicity of relatively small recesses provided in said leading edge portions in close relation to each other and a multiplicity of relatively small rollers rotatively mounted one in each recess with their outer peripheral portions exposed and substantially flush with and forming a substantial percentage of the outer surface area of said leading edge portions, the axes of the rollers being approximately at right angles to the direction of movement of the air over said rollers, said rollers being rotatively moved by the air and providing a multiplicity of moving air deflecting surfaces which minimize back pressure against said leading edge portions and minimize pressure buildup, heat generation, bow wave and sonic boom in the air incident on and in advance of and adjacent to said leading edge portions.